United States Patent
Guillemaut et al.

(10) Patent No.: US 9,738,373 B2
(45) Date of Patent: Aug. 22, 2017

(54) FISH JOINT DEVICE HAVING AN IMPROVED MECHANICAL HOLD

(75) Inventors: Julien Guillemaut, Toulouse (FR); Guillaume Gallant, Lareole (FR)

(73) Assignee: Airbus Operations (S.A.S.), Toulouse (FR)

( * ) Notice: Subject to any disclaimer, the term of this patent is extended or adjusted under 35 U.S.C. 154(b) by 301 days.

(21) Appl. No.: 13/979,939

(22) PCT Filed: Jan. 17, 2012

(86) PCT No.: PCT/FR2012/050102
§ 371 (c)(1),
(2), (4) Date: Jul. 16, 2013

(87) PCT Pub. No.: WO2012/098331
PCT Pub. Date: Jul. 26, 2012

(65) Prior Publication Data
US 2014/0263836 A1    Sep. 18, 2014

(30) Foreign Application Priority Data
Jan. 17, 2011  (FR) ...................... 11 50349

(51) Int. Cl.
*B64C 1/06*    (2006.01)
*B64C 1/26*    (2006.01)
*F16B 5/02*    (2006.01)

(52) U.S. Cl.
CPC ................. *B64C 1/26* (2013.01); *F16B 5/02* (2013.01); *Y10T 403/74* (2015.01)

(58) Field of Classification Search
CPC .... B64C 1/26; B64C 3/20; B64C 3/26; B64C 1/12; F16B 5/02
(Continued)

(56) References Cited

U.S. PATENT DOCUMENTS 2,760,898 A * 8/1956 Voelker ......................... 156/252
3,222,017 A   12/1965 Bobo
(Continued)

FOREIGN PATENT DOCUMENTS

CA    2486875 A1 *  6/2005
CA    2511847 A1 *  1/2006
(Continued)

OTHER PUBLICATIONS

French International Search Report for Application No. PCT/FR2012/050102 dated Jul. 12, 2012.
(Continued)

*Primary Examiner* — Brian M O'Hara
*Assistant Examiner* — Assres H Woldemaryam
(74) *Attorney, Agent, or Firm* — Jenkins, Wilson, Taylor & Hunt, P.A.

(57) ABSTRACT

The invention relates to a fish joint device intended to attach securely first and second structural elements of an aircraft to one another, having two fishplates positioned either side of the structural elements, and attached to them by a set of fishplate through fastenings. According to the invention, the fish joint device includes at least one intermediate fish joint plate which is positioned between one of said fishplates and said structural elements which said intermediate plate partly covers, and which is attached to these elements by a set of intermediate plate through fastenings which includes the set of fishplate through fastenings.

16 Claims, 5 Drawing Sheets

(58) Field of Classification Search
USPC .................................. 244/131, 132; 403/404
See application file for complete search history.

(56) References Cited

U.S. PATENT DOCUMENTS

| | | | |
|---|---|---|---|
| 3,416,274 A * | 12/1968 | Webb | 52/272 |
| 4,044,973 A | 8/1977 | Moorehead | |
| 4,507,011 A * | 3/1985 | Brown | 403/404 |
| 4,821,980 A | 4/1989 | Clausen | |
| 5,065,959 A | 11/1991 | Bhatia | |
| 5,443,229 A | 8/1995 | O'Brien | |
| 6,820,334 B2 * | 11/2004 | Kebbede et al. | 29/889.1 |
| 7,909,290 B2 * | 3/2011 | Cooper | 244/132 |
| 8,651,416 B2 | 2/2014 | Journade et al. | |
| 8,714,488 B2 * | 5/2014 | Burns et al. | 244/131 |
| 9,067,688 B2 | 6/2015 | Bellabal et al. | |
| 2004/0094669 A1 | 5/2004 | Koffi et al. | |
| 2005/0178887 A1 | 8/2005 | Beutin | |
| 2005/0183260 A1 * | 8/2005 | Meyer | B64C 1/12 29/524.1 |
| 2006/0038066 A1 | 2/2006 | Udall | |
| 2007/0246603 A1 | 10/2007 | Udall | |
| 2008/0105782 A1 | 5/2008 | Beardsley | |
| 2009/0020646 A1 * | 1/2009 | Normand et al. | 244/120 |
| 2009/0065644 A1 * | 3/2009 | Jacques | B29C 66/721 244/123.1 |
| 2009/0090811 A1 | 4/2009 | Llamas Sandin | |
| 2011/0284693 A1 * | 11/2011 | Barnard et al. | 244/132 |
| 2014/0064950 A1 | 3/2014 | Brochard | |
| 2014/0130512 A1 | 5/2014 | Chouard et al. | |
| 2015/0259074 A1 | 9/2015 | Guillemaut et al. | |

FOREIGN PATENT DOCUMENTS

| | | |
|---|---|---|
| CA | 2801366 A1 | 12/2011 |
| CA | 2839336 A1 | 12/2012 |
| EP | 1 541 464 | 6/2005 |
| EP | 2332834 A2 | 6/2011 |
| EP | 2631180 A1 | 8/2013 |
| FR | 2 915 458 | 10/2008 |
| FR | 2935953 A1 | 3/2010 |
| FR | 2950322 A1 | 3/2011 |
| FR | 2970700 A1 | 7/2012 |
| FR | 2976914 A1 | 12/2012 |
| FR | 2982841 A1 * | 5/2013 |
| FR | 2994941 A1 | 3/2014 |
| WO | WO 02/46625 | 6/2002 |
| WO | WO 2006/100400 | 9/2006 |
| WO | WO-2010/066985 A1 | 6/2010 |
| WO | WO 2012/098331 | 7/2012 |

OTHER PUBLICATIONS

French Search Report for Application No. FR 1363451 dated Aug. 18, 2014.
Restriction Requirement for U.S. Appl. No. 14/557,074 dated Jul. 1, 2016.
Final Office for U.S. Appl. No. 14/133,023 dated Aug. 18, 2016.
Non-Final Office Action for U.S. Appl. No. 14/575,332 dated Sep. 7, 2016.
English Translation of French International Search Report and Written Opinion for Application No. PCT/FR2012/050102 dated Jul. 19, 2012.

* cited by examiner

-- PRIOR ART --

FISH JOINT DEVICE HAVING AN IMPROVED MECHANICAL HOLD

TECHNICAL FIELD

The present invention relates generally to the field of joining by fishplating of the structural elements of an aircraft.

BACKGROUND

An aircraft structure contains many mechanical parts assembled with one another by fishplating.

Fishplating is understood to mean the assembly of elements by means of a separate part added on and attached to these elements by bolts, rivets or other through fastenings, where such an assembly is subjected to forces and/or moments.

This is the case, in particular, when assembling certain wing surface elements of the aircraft to the fuselage centre box.

Document WO 2006/100400, filed in the applicant's name, describes a fish joint device enabling such an assembly to be produced.

As shown in FIG. 1, this fish joint device includes a T-shaped fishplate 20 and a backing plate 30, attached to two consecutive structural elements 1, 2 and positioned either side of them. It should be noted that backing plate 30 is defined in this manner for the sake of linguistic convenience, in contrast with fishplate 20, and naturally constitutes a fishplate in the broad sense.

First structural element 1 is a wing lower surface panel and second element 2 is a lower panel of the centre box. A side panel 3, also called the main rib of the centre box, is also attached to T-shaped fishplate 20.

More specifically, T-shaped fishplate 20 includes a first branch for attaching wing lower surface panel 1, a second branch 22 for attaching box lower panel 2 roughly as an extension of first branch 21 (to the dihedral angle), and a third branch for attaching side panel 3 which is inclined relative to first two branches 21, 22, and roughly perpendicular to second branch 22.

First and second attachment branches 21, 22 are attached to respective structural elements 1, 2 by through fastenings 11.

Fastenings 11 are of the bolt or rivet type, and traverse fishplate 20, structural element 1, 2 in question, and backing plate 30.

A fish joint device, which contributes to forming the junction between the wing surface and the fuselage, must have satisfactory mechanical properties.

Indeed, the fuselage and the wing surface of an aircraft are subject to very substantial mechanical forces (force of gravity, aerodynamic forces, etc.). These forces cause bending, shearing and/or torsional stresses.

This requirement is also of course found in other types of application of fish joint devices.

However, the fishplate and the backing plate contain holes through which the through fastenings pass, around which the stresses tend to concentrate.

The stress concentration zones formed in this manner around the through fastenings thus have an increased risk of incipient cracks in the area of the fishplate and of the backing plate, thus impairing the mechanical properties of the fish joint device over time.

One solution consists increasing the thickness of the fishplate and/or of the backing plate so as to improve the mechanical properties of the fish joint device.

However, this increases the mass of the fish joint device, which is contrary to the habitual requirement to reduce the mass, particularly in the aeronautical field.

SUMMARY

The main aim of the invention is to provide a fish joint device including a fishplate and a backing plate intended to attach securely two structural elements of an aircraft to one another, having improved mechanical properties through the reduction of the maximum stresses in the stress concentration zones, whilst maintaining or reducing the mass of the fish joint device.

To achieve this, one object of the invention is a fish joint device intended to attach securely first and second structural elements of an aircraft to one another, having two fishplates positioned either side of the structural elements, and attached to them by a set of fishplate through fastenings.

According to the invention, the fish joint device includes at least one intermediate fish joint plate which is positioned between one of said fishplates and said structural elements which said intermediate plate partly covers, and which is attached to these elements by a set of intermediate plate through fastenings which includes said set of fishplate through fastenings.

A fishplate is understood to mean a mechanical part joining two adjacent or consecutive structural elements to which this part is added so as to allow certain forces to be transmitted between these two structural elements.

The two abovementioned fishplates constitute respectively a fishplate and a backing plate in the habitual meaning of the term, due to their positions either side of the structural elements.

A fishplate or intermediate plate through fastening is taken to mean a fastening which completely traverses the part in question and the structural elements, in the direction of thickness.

Including the set of fishplate through fastenings in the set of intermediate plate through fastenings implies that the fastenings of each fishplate of the device traverse each intermediate plate positioned between the fishplate and the structural elements.

In addition, the through fastenings can be rod-based devices, for example of the rivet, screw and bolt, rod and crimping ring type, or again of the lock bolt type.

The fish joint device according to the invention has smaller maximum stresses in the stress concentration zones, and therefore improved mechanical properties compared to a fish joint device having no intermediate fish joint plate.

The stress concentration zones of the fish joint device are the zones of the fishplate and of the backing plate, together with those of each intermediate fish joint plate, which surround the holes made in these parts for the through fastenings to pass through.

Due to the presence of at least one intermediate plate positioned between at least one of the two fishplates and the structural elements, the fish joint device according to the invention has a higher number of possible force transfer pathways.

The forces are thus not only transferred from the structural elements to the fishplate and to the backing plate via the through fastenings, as in the example of the prior art, but are also transferred to each intermediate fish joint plate.

In other words, the invention enables the transfer of the forces between the structural elements and the fish joint device to be discretised, thereby reducing the maximum stresses in the stress concentration zones.

Due to the reduction of the maximum stresses in the stress concentration zones, the number of intermediate fish joint plates and/or the thickness of said plates, and that of the two fishplates, may be optimised, resulting also in a reduced mass.

The two fishplates and each intermediate fish joint plate have clearance holes for the through fastenings. The diameter of each of the clearance holes traversed by a given fastening is preferably roughly identical, and roughly equal to the diameter of the rod of said fastening. By this means the fitting clearance of each fastening through the fishplates and each intermediate fish joint plate is roughly zero, allowing optimum transmission of the forces.

In a preferred embodiment of the invention, at least 50%, and preferably more than 66%, preferentially more than 75%, and even more preferentially 100%, of said set of intermediate plate through fastenings consist of said fishplate through fastenings. This means that for each intermediate fish joint plate positioned between one of the fishplates and the abovementioned structural elements, at least half the fastenings which traverse the intermediate plate also traverse said fishplate.

This characteristic enables the distribution of the stresses within each fishplate and each intermediate fish joint plate to be optimised, and therefore enables the maximum stresses in the stress concentration zones to be reduced optimally.

In the preferred embodiment of the invention, said intermediate plate through fastenings are distributed in several rows which extend in parallel to a joining direction of said structural elements, each of which has the same number of through fastenings.

A joining direction must be understood as being a direction of the respective edges of the structural elements facing one another and covered by the fish joint device.

Generally, each fishplate and each intermediate fish joint plate is advantageously dimensioned such that it is able to transmit, between said structural elements, a level of forces greater than or equal to 50%, preferably 100%, and even more preferentially 150%, of a reference level equal to the quotient of a predefined maximum level of forces, divided by the number of fishplates and of intermediate fish joint plate(s) of the device.

In the special case in which there is only a single intermediate plate positioned between one of the fishplates and the structural elements, the two fishplates and this intermediate plate are thus able to transmit at least one sixth of the predefined maximum level of forces, and preferably at least one third or two thirds of this maximum level of forces.

The predefined maximum level of forces is advantageously equal to a maximum level of forces which may be imposed on the fish joint device. This maximum level is preferably defined to withstand extreme operational conditions, in order to guarantee the best possible safety, notably in the case of application to the field of aeronautics.

Dimensioning must be understood to be principally the definition of the rigidity of the parts in question, by a judicious choice of the materials constituting them and/or of the thickness of these parts.

The fish joint device generally includes at least one intermediate fish joint plate positioned in contact with the structural elements having a Young modulus greater than that of the fishplate located on the same side as said intermediate plate relative to the structural elements.

The Young modulus is of course representative of the intermediate plate's rigidity.

In this case the device advantageously includes at least one other intermediate fish joint plate positioned between said fishplate and said intermediate fish joint plate positioned in contact with the structural elements, having a Young modulus less than that of this latter intermediate plate.

The relative rigidities of the abovementioned intermediate plate and the fishplate can notably be determined by a judicious choice of the materials constituting them and/or of the thicknesses of these parts.

The intermediate plate positioned in contact with the structural elements thus has a rigidity greater than that of the fishplate and of any other intermediate plates which may be interposed between this fishplate and this first intermediate plate. This enables the overall rigidity and global mass of the fish joint device to be optimised.

Indeed, it is desirable that the plate in contact with the structural elements should be the most rigid plate, and that the fishplate which covers it, together with any other intermediate plates which may be interposed, should be less rigid.

Indeed, excessive rigidity of the fishplate, and if applicable of these other intermediate plates, would lead to an increase of the bending moment generated within each fastening traversing it, which would increase the bending of each fastening.

And the bending rigidity of each fastening has a direct effect on the transfer of forces between the structural elements to be fished and the fish joint device. The higher the bending rigidity of the fastenings, the better the fishplating efficiency.

This rigidity therefore has a direct effect on the properties of the fish joint device in static terms, but also in fatigue terms.

In particular, said intermediate fish joint plate positioned in contact with the structural elements preferably has a local thickness of between 50% and 80% of the combined local thickness of said fishplate and of each intermediate fish joint plate positioned between said fishplate and the structural elements.

The term local thickness must of course be understood to mean the thickness measured perpendicularly to each point of the surface of the part in question.

The thickness of said intermediate fish joint plate positioned in contact with said structural elements is preferentially strictly greater than the local thickness of said fishplate.

The greater thickness of this intermediate fish joint plate enables it to be conferred with greater rigidity.

As a variant, this intermediate fish joint plate may be less thick, but made of a more rigid material.

If applicable, the local thickness of the other intermediate fish joint plates of the device may be optimised using a digital application simulating the flow of stresses in such a fish joint device, so as to allow, in addition, a mass saving.

In addition, said fishplate advantageously has a local thickness of between 20% and 50% of the combined local thickness of said fishplate and of each intermediate fish joint plate positioned between said fishplate and said structural elements.

In the preferred embodiment of the invention one of said fishplates is made of a metal material, for example aluminium, steel or titanium, the other fishplate is made of a metal material, for example aluminium, steel or titanium, or of a composite material, and each intermediate fish joint plate is made of a composite material.

A composite material is understood to mean a material including a blend of fibres and resin.

If the device includes several intermediate fish joint plates positioned on the same side relative to the structural elements, these plates may be made of the same material or of different materials, where the material(s) is/are chosen from among metal or composite materials. All the intermediate plates are preferably made of the same composite material. These intermediate plates are advantageously of an identical general shape.

One of the two fishplates may be a T-shaped fishplate including a first branch for attaching said first structural element, a second branch for attaching said second structural element roughly aligned as an extension of the first branch, to the dihedral angle, and a third attachment branch inclined relative to said first and second branches. The other fishplate is then commonly called a backing plate.

In this case a third structural aircraft element may be attached to the third attachment branch of the T-shaped fishplate.

The invention also relates to an aircraft structure, having an aircraft wing surface including a wing surface element, forming a first structural element, and a fuselage box including a lower panel, forming a second structural element, where said wing surface element and said lower panel are securely attached to one another by means of a fish joint device of the type described above.

Finally, the invention relates to a method for fishplating two structural elements of an aircraft to one another by means of a device of the type described above, in which:
  the two fishplates, together with each intermediate fish joint plate of the device between one of the fishplates and said structural elements, are positioned either side of said structural elements;
  said fishplates and each intermediate fish joint plate are attached to said structural elements by means of the set of intermediate plate through fastenings.

Other advantages and characteristics of the invention will appear in the non-restrictive detailed disclosure below.

BRIEF DESCRIPTION OF THE DRAWINGS

Embodiments of the invention will now be described, as non-restrictive examples, with reference to the appended illustrations, in which.

Previously described

In all these figures, identical references can designate identical or comparable elements.

DETAILED DESCRIPTION

Figure 1:
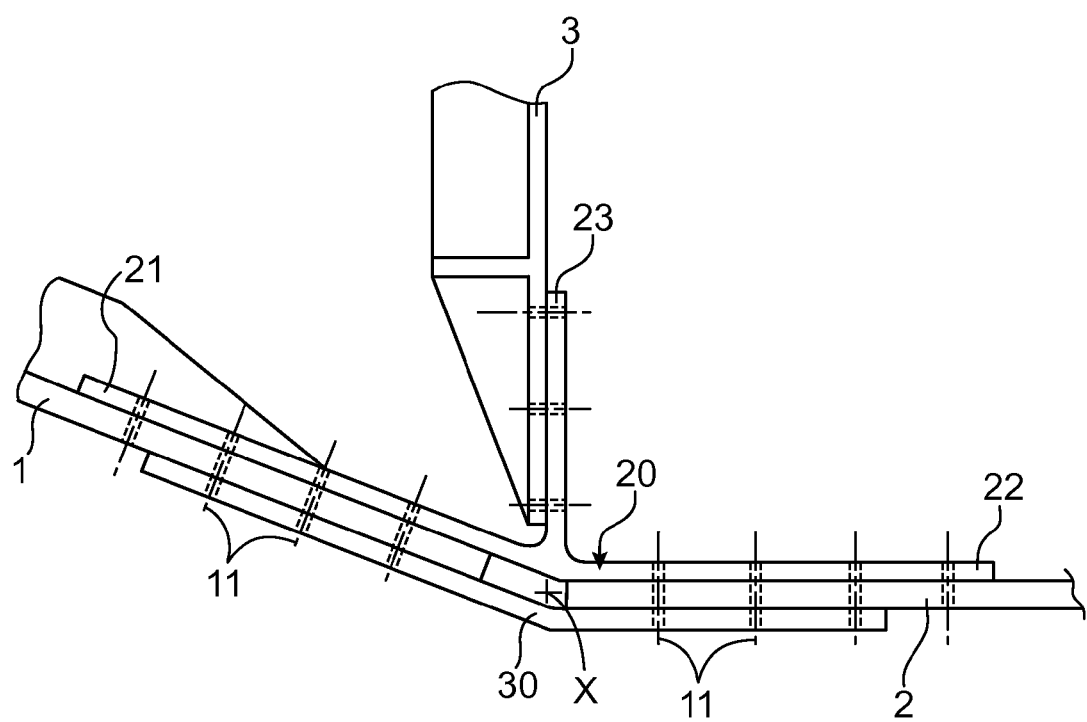
FIG. 1 is a schematic lengthways section view of a fish joint device according to an example of the prior art.
Figure 2A:
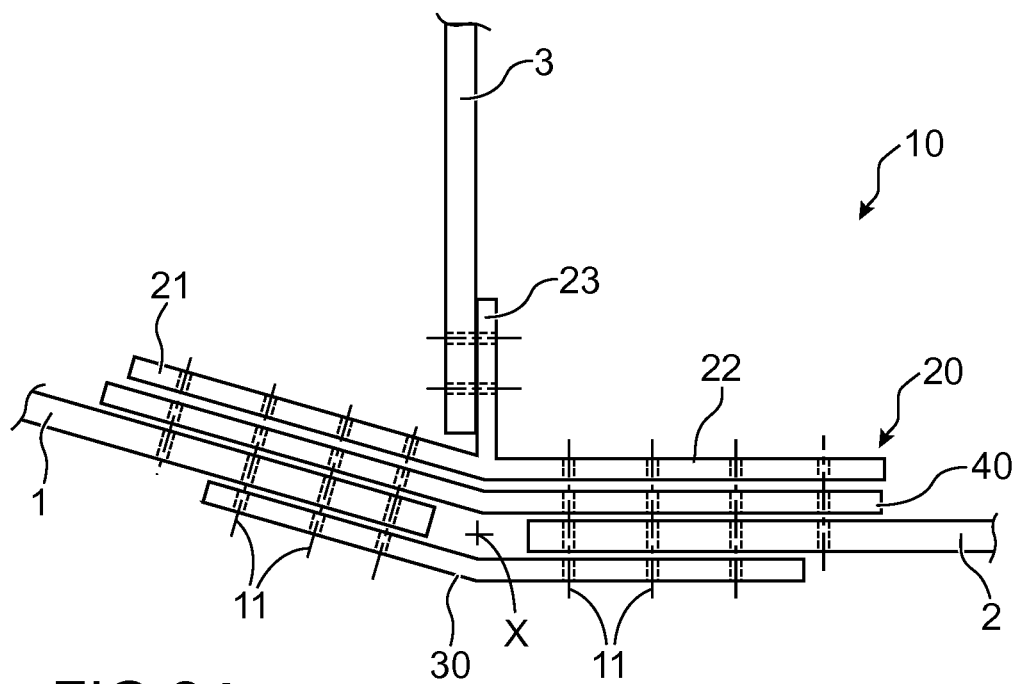
FIGS. 2A and 2B are schematic transverse section views of fish joint devices according to two first embodiments of the invention.

FIG. 2A shows schematically, as a transverse section, a fish joint device 10 according to a first embodiment of the invention.

It should be noted that the illustration is not to scale, to improve its clarity.

Fish joint device 10 according to the invention is intended to attach securely together structural elements 1, 2 of an aircraft.

It includes a T-shaped fishplate 20 including a first, a second and a third attachment branches 21, 22, 23.

First and second attachment branches 21, 22 are roughly an extension of one another, to the dihedral angle.

Third attachment branch 23 is inclined relative to first and second branches 21, 22 of fishplate 20. In particular, third branch 23 extends roughly orthogonally to second branch 22.

Fish joint device 10 also includes a second fishplate 30, called a backing plate in what follows, which is attached to said structural elements 1, 2.

Backing plate 30 takes the form of a plate designed to come into contact with structural elements 1, 2, and is positioned on the side opposite that of fishplate 20.

In the illustrated example, structural element 1 is a lower element of a wing surface of an aircraft, whereas element 2 is a lower panel of a central box of the aircraft, and element 3 is a side panel of this central box. Such a central box is, indeed, formed from lower, side and upper panels assembled together with one another.

As shown by FIG. 2A, fishplate 20 and backing plate 30 are attached to structural elements 1, 2 by means of fishplate through fastenings 11.

First and second structural elements 1, 2, are said to be adjacent or consecutive, if they are positioned roughly as extensions to one another.

These two elements have respective edges which are facing one another, and which extend in a joining direction X.

More specifically, first branch 21 of fishplate 20 is attached to first structural element 1, and second branch 22 of the fishplate is attached to second structural element 2.

They are attached by means of through fastenings 11 which traverse fishplate 20, structural element 1, 2 in question, and backing plate 30.

Fastenings 11 are rod-based devices, for example of the rivet, screw and bolt, rod and crimping ring type, or of the lock bolt type.

Clearance holes are thus present in fishplate 20, backing plate 30 and structural elements 1, 2, to receive fastenings 11.

In the first embodiment of the invention illustrated in FIG. 2A, fish joint device 10 includes an intermediate fish joint plate 40 positioned between fishplate 20 and structural elements 1, 2.

There may be a single intermediate fish joint plate 40, as illustrated in FIG. 2, or several intermediate plates superposed on one another, for example two, three, four, five or more such plates.

Intermediate fish joint plate 40 is thus sandwiched between structural elements 1, 2, firstly, and fishplate 20, secondly.

It has a shape which is designed to come into full contact with first and second attachment branches 21, 22 of fishplate 20.

Intermediate fish joint plate 40 includes clearance holes aligned with those of structural elements 1, 2, those of fishplate 20, and those of backing plate 30, so as to receive fishplate through fastenings 11.

Each fishplate through fastening 11 thus traverses both corresponding structural element 1 or 2, intermediate fish joint plate 40 and fishplate 20 and/or backing plate 30. Each fishplate through fastening 11 thus also an intermediate plate through fastening in the terminology used in the present invention.

Fishplate 20, backing plate 30 and intermediate fish joint plate(s) 40 have clearance holes for fastenings 11. The diameter of each of the clearance holes traversed by a given fastening 11 is roughly identical, and roughly equal to the diameter of said fastening 11, such that the latter is in contact with the side wall of the holes which it occupies almost without any clearance.

In accordance with a preferential characteristic of the invention, intermediate fish joint plate 40, which is in contact with structural elements 1, 2, has a local thickness which is strictly 50% greater than the combined local thickness, whilst being less than 80% of it. The combined local thickness is the sum of the local thickness of intermediate plate 40 and of the local thickness of attachment branch 21, 22 in question of corresponding fishplate 20.

This intermediate fish joint plate 40 thus has a rigidity greater than that of fishplate 20, which is located on the same side as said intermediate plate 40 relative to said structural elements 1, 2.

Attachment branch 21, 22 in question of fishplate 20 has a local thickness of between 20% and 50% of the combined local thickness.

Fishplate 20 is monolithic and manufactured as a single piece from a metal material, for example aluminium, steel, or titanium.

Backing plate 30 is monolithic and produced from a metal material, for example aluminium, steel or titanium, or from a composite material including a blend of fibres and resin. Backing plate 30 is preferably manufactured from a composite material.

Intermediate plate 40 is monolithic and produced from a metal material, for example aluminium, steel or titanium, or from a composite material including a blend of fibres and resin. The intermediate plate is preferably made from a composite material.

It should be noted that each of fishplate 20, backing plate 30 and intermediate plate 40 is dimensioned such that it is capable of transferring more than one third of the maximum level of forces which may be imposed on the fish joint device. This value of one third is equal to 50% of the quotient of the abovementioned maximum level of forces divided by the number of fishplates and intermediate fish joint plate(s), which in this case is equal to three.

Device 10 according to the invention has a large number of force transfer pathways from structural element 1, 2 in question in the fish joint device.

Indeed, the forces experienced by first (respectively second) structural element 1, 2 are transferred into first (respectively second) attachment branch 21, 22 of fishplate 20, into backing plate 30, and into intermediate fish joint plate(s) 40, via the set of intermediate plate fastenings 11, which include the fastenings of fishplates 20, 30.

This results in a greater discretisation of the transfer of the forces compared to the fish joint device according to the prior art, which enables the maximum stresses present in the stress concentration zones of the fish joint device, namely the zones surrounding the clearance holes of fastenings 11, to be reduced.

Figure 2B:
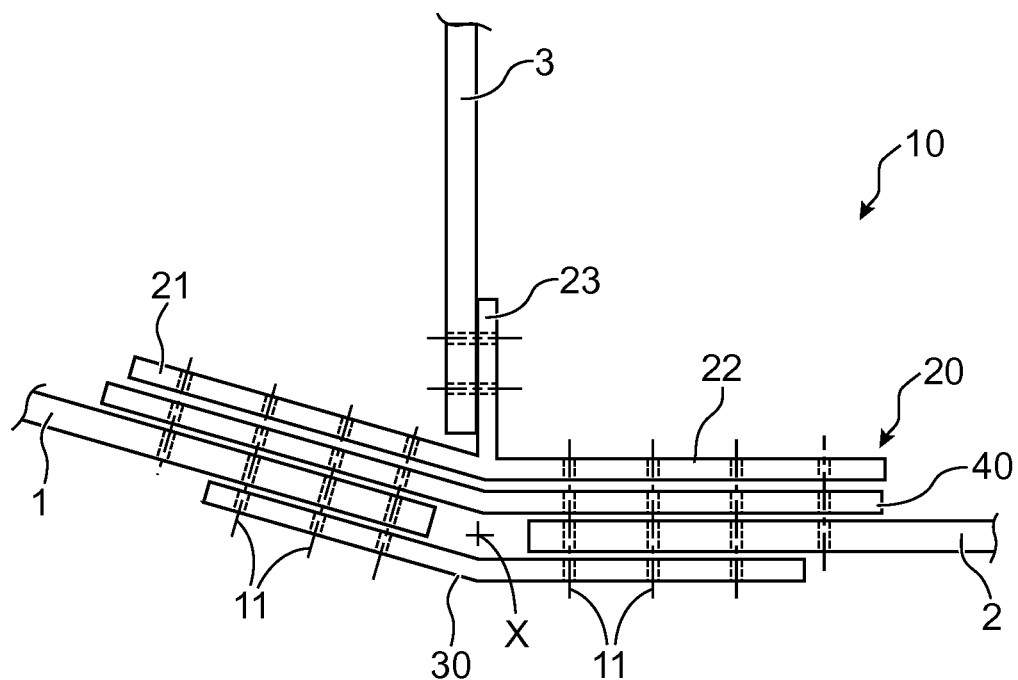

FIG. 2B illustrates a fish joint device according to a second embodiment of the invention, in which fishplate 20 takes the form of a simple plate similar to intermediate fish joint plate 40, and is surmounted by a joining piece with a T-shaped section having two branches attached to fishplate 20, each by means of a row of through fastenings 11, and also a third branch 23 for attachment to third structural element 3.

In this case also, each of fishplate 20, backing plate 30 and intermediate plate 40 is dimensioned so as to be capable of transferring more than 33% of a maximum level of forces admissible within the fish joint device.

Figure 3:
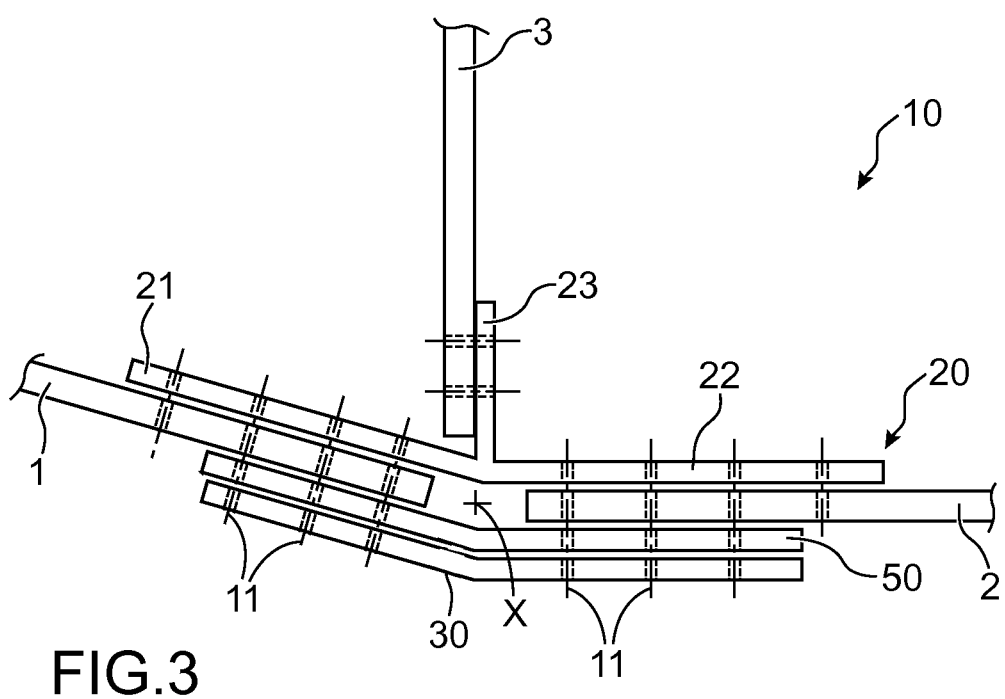
FIG. 3 is a schematic transverse section view of a fish joint device according to a third embodiment of the invention.

FIG. 3 illustrates a fish joint device according to a third embodiment of the invention, which differs from the one described in reference to FIG. 2A essentially in that it includes an intermediate fish joint plate 50 positioned not on the side of fishplate 20, but on the side of backing plate 30.

The above explanations relative to intermediate fish joint plate 40 of FIG. 2A naturally apply to intermediate fish joint plate 50 of FIG. 3.

Figure 4:
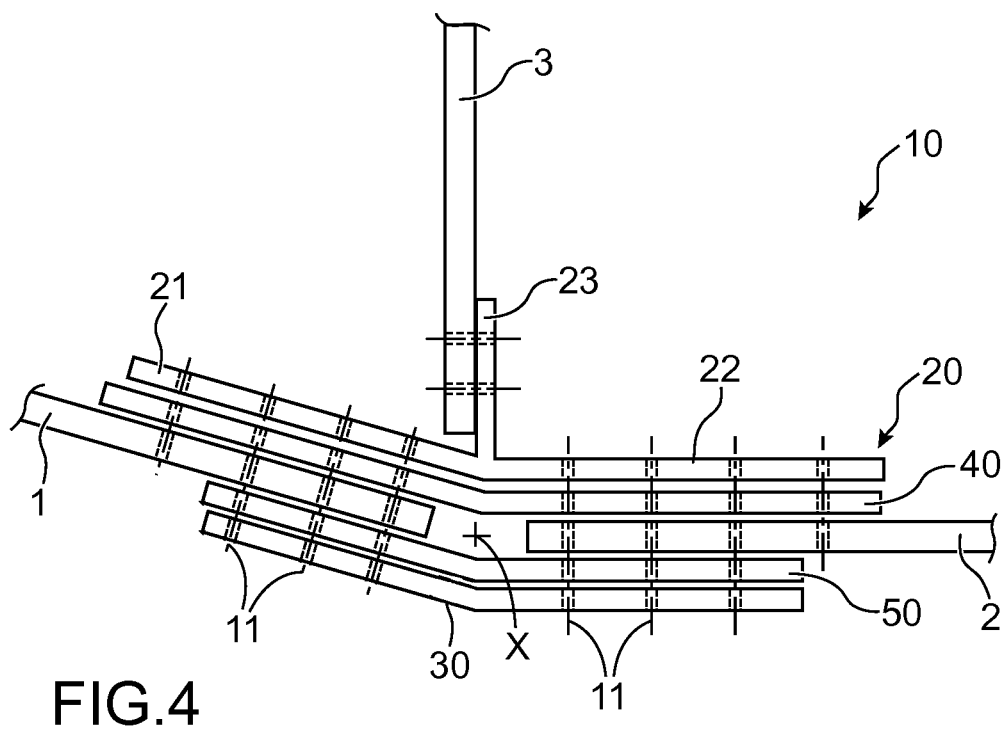
FIG. 4 is a schematic transverse section view of a fish joint device according to a fourth embodiment of the invention.

FIG. 4 illustrates a fish joint device according to a third embodiment of the invention, which includes an intermediate fish joint plate 40 positioned between fishplate 20 and structural elements 1, 2, and an intermediate fish joint plate 50 positioned between backing plate 30 and structural elements 1, 2.

Intermediate fish joint plates 40, 50 are similar to those described above.

Assembly by fishplating of structural elements 1, 2 according to any one of the invention's embodiments may be accomplished in the following manner:

- a fishplate 20 and a backing plate 30, and also at least one intermediate fish joint plate 40 positioned between said fishplate 20 and said structural elements 1, 2, and/or at least one intermediate fish joint plate 50 positioned between said backing plate 30 and said structural elements 1, 2, are positioned either side of said structural elements 1, 2; and then
- said fishplate 20, said backing plate 30, and each intermediate fish joint plate 40, 50, are attached to said structural elements 1, 2 by means of intermediate plate through fastenings 11.

The invention claimed is:

1. A fish joint device configured to securely attach first and second structural elements of an aircraft to one another, the fish joint device comprising:
   a first fishplate disposed on either side of the first and second structural elements;
   a second fishplate disposed on a side of the first and second structural elements opposite the first fishplate, the second fishplate including a first attachment branch, a second attachment branch, and a third attachment branch;
   a set of through fastenings configured to attach the first and second fishplates to the first and second structural elements, the second fishplate being attached to the first and second structural elements by the first and second attachment branches, respectively, and to a third structural element by the third attachment branch; and
   at least one intermediate fish joint plate disposed between and in contact with one of the first or second fishplates and the first and second structural elements, respectively, wherein the intermediate fish joint plate at least partly covers and is attached to the first and second structural elements by at least some of the through fastenings,
   wherein the at least one intermediate fish joint plate has a flexural rigidity greater than the first or second fishplate located on a same side as the at least one intermediate fish joint plate, relative to the first and second structural elements, and wherein the first and second fishplates and the at least one intermediate fish joint plate are configured to transmit forces experienced by the first and second structural elements into the first and second fishplates and the at least one intermediate fish joint plate.

2. The fish joint device according to claim 1, wherein at least 50% of the through fastenings passing through the at least one intermediate fish joint plate also pass through the first or second fishplate on the same side of the first and second structural elements as the at least one intermediate fish joint plate.

3. The fish joint device according to claim 2, wherein the through fastenings passing through the at least one intermediate fish joint plate are distributed in several rows which extend in parallel to a joining direction of the first and second structural elements, each of which has a same number of the through fastenings.

4. The fish joint device according to claim 1, wherein each fishplate and each of the at least one intermediate fish joint plate is dimensioned and configured to transmit, between the first and second structural elements, a level of forces greater than or equal to 50% of a reference level equal to a quotient of a predefined maximum level of forces, divided by a number of fishplates and intermediate fish joint plate(s) of the fish joint device.

5. The fish joint device according to claim 1, wherein the at least one intermediate fish joint plate comprises at least two intermediate fish joint plates, at least one second intermediate fish joint plate being disposed between the first or second fishplate and a first intermediate fish joint plate which is in contact with the first and second structural elements, the at least one second intermediate fish joint plate having a rigidity less than or equal to that of the first intermediate fish joint plate.

6. The fish joint device according to claim 1, wherein the at least one intermediate fish joint plate comprises a local thickness of between 50% and 80% of a combined local thickness of the first or second fishplate and each of the at least one intermediate fish joint plate between the first or second fishplate and the first and second structural elements.

7. The fish joint device according to claim 6, wherein the at least one intermediate fish joint plate in contact with the first and second structural elements has a local thickness strictly greater than a local thickness of the first or second fishplate.

8. The fish joint device according to claim 6, wherein the first or second fishplate on a same side of the first and second structural elements as the at least one intermediate fish joint plate has a local thickness of between 20% and 50% of the combined local thickness of the first or second fishplate and each of the at least one intermediate fish joint plate.

9. The fish joint device according to claim 1, wherein the first or second fishplates comprises a metal material, wherein another of the first or second fishplates comprises a metal material or a composite material, and wherein each of the at least one intermediate fish joint plate comprises a composite material.

10. An aircraft structure comprising an aircraft wing surface including a wing surface element, forming the first structural element, a fuselage box including a lower panel, forming the second structural element, and the fish joint device according to claim 1 to securely attach the wing surface element and the lower panel of the fuselage box.

11. The fish joint device according to claim 1, wherein more than 66% of the through fastenings passing through the intermediate fish joint plates also pass through the first or second fishplate on a same side of the first and second structural elements as the at least one intermediate fish joint plate.

12. The fish joint device according to claim 1, wherein more than 75% of the through fastenings passing through the intermediate fish joint plates also pass through the first or second fishplate on a same side of the first and second structural elements as the at least one intermediate fish joint plate.

13. The fish joint device according to claim 1, wherein 100% of the through fastenings passing through the intermediate fish joint plates also pass through the first or second fishplate on a same side of the first and second structural elements as the at least one intermediate fish joint plate.

14. The fish joint device according to claim 1, wherein each fishplate and each of the at least one intermediate fish joint plate is dimensioned and configured to transmit, between the first and second structural elements, a level of forces greater than or equal to 100% of a reference level equal to a quotient of a predefined maximum level of forces, divided by a number of fishplates and intermediate fish joint plate(s) of the fish joint device.

15. The fish joint device according to claim 1, wherein each fishplate and each of the at least one intermediate fish joint plate is dimensioned and configured to transmit, between the first and second structural elements, a level of forces greater than or equal to 150% of a reference level equal to a quotient of a predefined maximum level of forces, divided by a number of fishplates and intermediate fish joint plate(s) of the fish joint device.

16. A method for fishplating first and second structural elements of an aircraft together, the method comprising:
   providing a fish joint device comprising:
      a first fishplate disposed on either side of the first and second structural elements;
      a second fishplate disposed on a side of the first and second structural elements opposite the first fishplate, the second fishplate including a first attachment branch, a second attachment branch, and a third attachment branch;
      a set of through fastenings configured to attach the first and second fishplates to the first and second structural elements, the second fishplate being attached to the first and second structural elements by the first and second attachment branches, respectively, and to a third structural element by the third attachment branch; and
      at least one intermediate fish joint plate disposed between and in contact with one of the first or second fishplates and the first and second structural elements, respectively, wherein the intermediate fish joint plate at least partly covers and is attached to the and second structural elements by at least some of the through fastenings,
      wherein the at least one intermediate fish joint plate has a flexural rigidity greater than the first or second fishplate located on the same side as the at least one intermediate fish joint plate, relative to the first and second structural elements, and
      wherein the first and second fishplates and the at least one intermediate fish joint plate are configured to transmit forces experienced by the first and second structural elements into the first and second fishplate and the at least one intermediate fish joint plate;
   positioning the first and second fishplates, together with each of the at least one intermediate fish joint plate of the device between the first or second fishplate and the first and second structural elements, on either side of the first and second structural elements;

attaching the first and second fishplates and each of the at least one intermediate fish joint plate to the first and second structural elements by the through fastenings; and transmitting, by each fishplate and the at least one intermediate fish joint plate, forces experienced by the first and second structural elements into the first and second fishplate and the at least one intermediate fish joint plate.

* * * * *

UNITED STATES PATENT AND TRADEMARK OFFICE
CERTIFICATE OF CORRECTION

PATENT NO.          : 9,738,373 B2
APPLICATION NO.     : 13/979939
DATED               : August 22, 2017
INVENTOR(S)         : Julien Guillemaut and Guillaume Gallant It is certified that error appears in the above-identified patent and that said Letters Patent is hereby corrected as shown below:

At Column 10, Line 53 Claim 16:
Before the words "and second" insert --first--.

Signed and Sealed this
Twenty-second Day of May, 2018

Andrei Iancu
*Director of the United States Patent and Trademark Office*